Jan. 1, 1929.
F. VISINTAINER
SMOKING PIPE
Filed Feb. 7, 1928
1,697,034
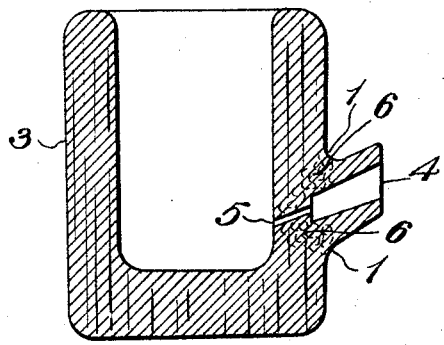
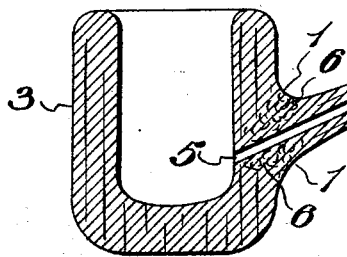
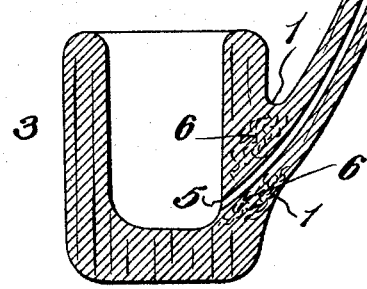
Inventor
Felix Visintainer
by
Charles H Shamel
his Attorney Patented Jan. 1, 1929.

1,697,034

UNITED STATES PATENT OFFICE.

FELIX VISINTAINER, OF GLACIER, WASHINGTON.

SMOKING PIPE.

Application filed February 7, 1928. Serial No. 252,609.

My invention relates to improvements in pipes used for smoking tobacco and other dried substances. Such pipes are made of many substances such as stone, meerschaum, corn cobs, wood and other material. Probably more such pipes are made of wood than of any other material. Wooden pipes are usually made from a stick, with or without the bark on it of about the size desired for the outside of the pipe bowl, or by turning or otherwise shaping a larger piece of wood to the outside of the pipe bowl and then, whatever the original form, boring or otherwise cutting out the hollow of the bowl with its greatest length parallel, to the grain of the wood, and then boring in from one side of the bottom of the bowl a hole of the proper size and shape for inserting the stem.

Pipe bowls so made, are liable to crack or split open through the hole for inserting the stem either by the action of the heat in the interior of the bowl, or by pressure from the stem or otherwise.

My invention relates to improvements in wooden pipes whereby I secure a wooden pipe which cannot split through the stem-hole and is less liable to split elsewhere.

In the drawing Fig. 1 is a vertical section through the form of my improved pipe made for use with an inserted stem; Figs. 2 and 3 are vertical sections through other forms of my improved pipe which are described in detail below.

In the figures, 1 is the junction of the tree stem of limb and the smaller side limb as hereinafter described; 2 is the stem in the forms of my improved pipe shown in Figs. 2 and 3; 3 is the bowl of the pipe; 4 is a large hole in the short side limb of Fig. 1 large enough for the insertion therein of the end of a separate stem; 5 is the small hole from the bowl of the pipe to the stem; 6 is the curly interwoven wood fibers which always occur at the junction of a small side limb with the tree stem or larger limb on which the smaller limb goes.

I make my improved pipes by taking a section of a tree stem or large limb of the proper length and diameter for making a pipe bowl of the size desired out of one side of which there has grown a smaller side branch. It is well known that at the juncture of a small limb with a tree stem or another larger branch, there is always an area somewhat larger than the side branch where the fibers of the larger stem or limb and the smaller side limb are curled, twisted and interwoven so that the wood will not split through that area but can there only be cut or sawn.

I preferably leave a short length of the side limb, say ¼ to ¾ of an inch and bore in it the proper sized hole at the desired angle, for inserting the pipe stem and connect this hole by a smaller hole 5, with the hollow of the bowl of the pipe, but, of course, the side limb may be cut off level with the surface. I then complete the pipe by inserting in the pipe stem hole any kind of a pipe stem desired. Such a pipe will not split at the stem hole under any conditions, and will only split elsewhere with difficulty, no matter what degree of heat or rough treatment it may be subjected to.

It is preferable in seasoning the wood for making my pipes to leave the smaller side limb several inches longer than above stated, so that as it dries such cracks as occur at the end of the side limb will not extend down to the part to be used, as above explained, for making the stem hole. It is likewise preferable, while the wood is seasoning, to have the larger part of which the bowl is to be made longer, in both directions, than the bowl will finally be for the same purpose of avoiding cracks in the part made into the bowl. For the same purpose it is also well to coat all cut ends with some kind of paint during the seasoning process.

Instead of boring a hole in only a short piece of the side limb, as described above, for inserting a separate stem, I may leave such side limb of sufficient length to itself answer as the stem of the pipe by boring a small hole down its entire length to connect with the bowl of the pipe. After this has been done, by steaming the wood, such side-branch stem can be bent to any desired direction and curved in any shape and made to permanently retain such shape by holding it in the same while it is drying in the manner well-known in the wood-working art.

My improved pipes can be made with or without the bark on the outside of the bowl and the short or long side-limb part. They will last for years with constant usage, and are stronger than any other form of pipe. They are especially adapted for use by miners, railroad men, farmers and other working men who frequently work without coat or vest and so must carry their pipe in their side or hip pockets where they are subject to much pressure and rough usage that ordinary pipes are frequently broken.

I claim:

1. A smoking pipe of wood comprising a bowl hollowed out of a tree stem or large limb on the side of which there is a smaller limb and with the pipe stem inserted at the juncture of the small side limb with the larger stem or branch.

2. A smoking pipe of wood comprising a bowl hollowed out of a tree stem or large limb on the side of which there is a smaller side limb in which is a small hole connecting with the bowl of the pipe so that side limb acts as the stem of the pipe.

3. A wooden smoking pipe made out of a tree stem or large limb with a smaller limb on the side thereof and with the pipe stem connected with the bowl at the juncture of the small side limb and the larger tree stem or limb.

4. A wooden smoking pipe bowl made out of a tree stem or a large limb with a smaller limb on the side thereof, and with the hole for inserting the pipe stem in the juncture of the small side limb and the larger tree stem or limb.

FELIX VISINTAINER.